United States Patent
Davydov et al.

(10) Patent No.: US 9,603,140 B2
(45) Date of Patent: Mar. 21, 2017

(54) RESOURCE ALLOCATION (71) Applicant: Intel Corporation, Santa Clara, CA (US)

(72) Inventors: Alexei Davydov, Nizhny Novgorod (RU); Gi Wan Choi, San Jose, CA (US); Gregory Morozov, Nizhny Novgorod (RU); Vadim Sergeyev, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 112 days.

(21) Appl. No.: 14/581,520

(22) Filed: Dec. 23, 2014

(65) Prior Publication Data
US 2016/0088593 A1 Mar. 24, 2016

Related U.S. Application Data (60) Provisional application No. 62/054,339, filed on Sep. 23, 2014.

(51) Int. Cl.
*H04L 5/00* (2006.01)
*H04W 72/04* (2009.01)
*H04L 1/00* (2006.01)

(52) U.S. Cl.
CPC .......... *H04W 72/042* (2013.01); *H04L 1/00* (2013.01); *H04L 5/003* (2013.01); *H04L 5/0055* (2013.01)

(58) Field of Classification Search
None
See application file for complete search history.

(56) References Cited

U.S. PATENT DOCUMENTS

| | | | | |
|---|---|---|---|---|
| 8,548,514 B2* | 10/2013 | Kim | ...... | H04L 5/0048 370/241 |
| 8,737,344 B2* | 5/2014 | Yang | ...... | H04L 5/0023 370/329 |
| 2010/0323709 A1* | 12/2010 | Nam | ...... | H04B 7/043 455/450 |
| 2012/0063413 A1* | 3/2012 | Kroener | ...... | H04W 72/12 370/330 |
| 2013/0028212 A1* | 1/2013 | Lohr | ...... | H04W 72/042 370/329 |
| 2013/0089063 A1* | 4/2013 | Yang | ...... | H04L 5/0023 370/329 |
| 2013/0329686 A1* | 12/2013 | Kim | ...... | H04W 72/04 370/329 |
| 2014/0044085 A1* | 2/2014 | Hong | ...... | H04L 5/0037 370/329 |
| 2014/0226739 A1* | 8/2014 | Onggosanusi | ...... | H04B 7/0456 375/267 |

(Continued)

*Primary Examiner* — Eunsook Choi
(74) *Attorney, Agent, or Firm* — Schwabe, Williamson & Wyatt, P.C.

(57) ABSTRACT

Device, system and methods for flexible resource allocation are described. In particular, there is described a user receive a user equipment configured to receive higher-layer configuration of flexible resource allocation; receive dynamic information on the downlink resource allocation in a given downlink (DL) subframe; split the resource allocation into resource allocation sub-blocks; independently decode physical downlink shared channel (PDSCH) within each resource allocation sub-block; AND report ACK/NACK for the resource allocation.

18 Claims, 7 Drawing Sheets

(56) References Cited

U.S. PATENT DOCUMENTS

| | | | |
|---|---|---|---|
| 2014/0293922 A1* | 10/2014 | Wang | H04W 72/042 |
| | | | 370/329 |
| 2014/0307692 A1* | 10/2014 | Hong | H04W 72/042 |
| | | | 370/329 |
| 2015/0098420 A1* | 4/2015 | Luo | H04L 1/0025 |
| | | | 370/329 |

* cited by examiner

RESOURCE ALLOCATION

CROSS REFERENCE TO RELATED APPLICATIONS

The present application claims priority to U.S. Provisional Patent Application No. 62/054,339, filed Sep. 23, 2014, entitled "METHOD OF FLEXIBLE RESOURCE ALLOCATION FOR MU-MIMO WITH CODEWORD-LEVEL INTERFERENCE CANCELLATION RECEIVER" the entire disclosure of which is hereby incorporated by reference.

TECHNICAL FIELD

Embodiments described herein generally relate to the field of wireless communications and, more particularly, to methods and apparatus for resource allocation.

BACKGROUND OF THE INVENTION

Figure 1:
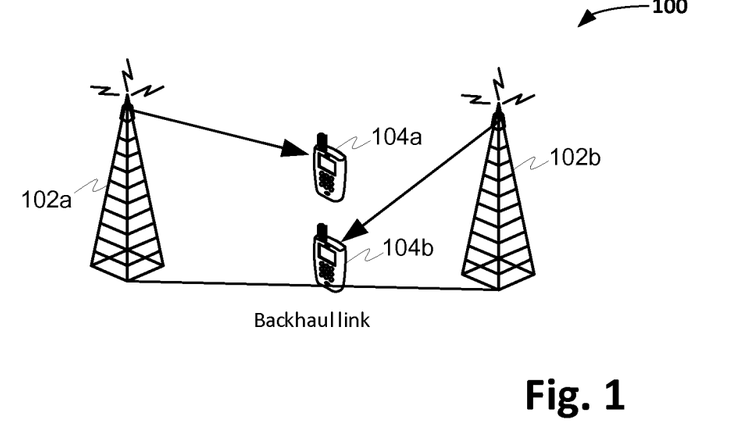
FIG. 1 illustrates a wireless communication network experiencing inter-cell interference.

In order to increase the data carrying capacity of LTE-A networks, the density of the network deployments should be increased to achieve higher cell-splitting gains. In such scenarios, co-channel interference from the neighboring cells 102a, 102b, as illustrated in FIG. 1, becomes a limiting factor for achieving higher network capacity.

In systems implementing Rel-11 of the LTE standards, such interference has been mitigated by using interference mitigation at user equipment (UE) 104 by accounting for spatial properties of interfering signals in a Minimum Mean Squared Error-Interference Rejection Combining (MMSE-IRC) receiver. In Rel-12, the performance of interference mitigation schemes at the UE was further improved by considering more advanced receiver algorithms. These more advanced algorithms were able to utilize additional information about the structure of interference (e.g. its distribution). For example, a receiver could estimate interference parameters such as a transmission mode, interference presence, modulation and precoding, etc. to facilitate interference cancellation and suppression at a symbol level using e.g. enhanced MMSE-IRC, maximum likelihood (ML) or symbol level interference cancellation (SLIC) receivers.

Figure 2:
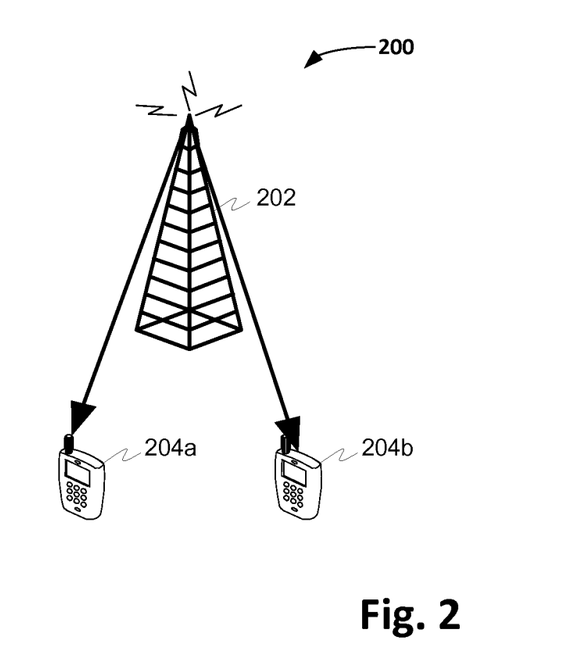
FIG. 2 illustrates a wireless communication network experiencing intra-cell interference.

Another approach that has been introduced to increase capacity of LTE networks is multi user MIMO (MU-MIMO) schemes that facilitate simultaneous (concurrent) physical downlink shared channel (PDSCH) transmissions from an eNB to multiple UEs (using different layers) on the same time and frequency resources, as illustrated in FIG. 2. MU-MIMO has been defined in the LTE standards since Rel-8 (PMI-based TM5) and was further enhanced in Rel-9/10/11 (DMRS-based TM8/9/10). The simultaneous transmission of PDSCH in MU-MIMO on the same time and frequency resources introduces so called intra-cell interference between the layers designated to different UEs of the same cell. If there is insufficient spatial isolation between channels associated with the different UEs, the residual intra-cell interference may become a limiting factor on network capacity within the cell.

BRIEF DESCRIPTION OF THE DRAWING

Aspects, features and advantages of embodiments of the present invention will become apparent from the following description of the invention in reference to the appended drawings in which like numerals denote like elements and in which.

DETAILED DESCRIPTION OF EMBODIMENTS

Illustrative embodiments of the present disclosure include, but are not limited to, methods, systems, and apparatuses for controlling resource allocations of co-scheduled layers in a MU-MIMO wireless communication system.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment;

however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

FIG. 2 schematically illustrates a wireless communication network 200 that may implement various embodiments. Wireless communication network 200 (hereinafter "network 200") may be an access network of a 3rd Generation Partnership Project (3GPP) long-term evolution (LTE) or long-term evolution-advanced (LTE-A) network such as an evolved universal mobile telecommunication system (UMTS) terrestrial radio access network (EUTRAN).

The network 200 may include a base station, e.g., evolved node base station (eNB) 202, configured to wirelessly communicate with one or more mobile device(s) or terminal(s), e.g., user equipment (UE) 204a, 204b. In various embodiments, the eNB 202 may be a fixed station (e.g., a fixed node) or a mobile station/node.

In various embodiments, the UEs 204a, 204b and/or the eNB 202, may include a plurality of antennas to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO or variations of smart antenna processing.

Code word level interference cancellation (CWIC) has been proposed to provide better interference cancellation efficiency (as compared to symbol level interference cancellation), since they are able to additionally exploit the channel coding properties of the signals to better suppress and cancel interference from the received signal.

The following types of CWIC receivers may be suitable for intra-cell interference cancellation in MU-MIMO:
Linear Code word level SIC (L-CWIC):
    receiver utilizing successive application of linear detection (e.g.: LMMSE-IRC), decoding, re-encoding, and cancellation
    may have iteration (e.g. Turbo L-CWIC)
    may utilize CRC check (e.g. hard L-CWIC)
ML-CWIC:
    receiver utilizing successive application of ML or reduced complexity ML detection, decoding, re-encoding, and cancellation
    may have iteration (e.g. Turbo ML-CWIC)
    may utilize CRC check (e.g. hard ML-CWIC)

Figure 3:
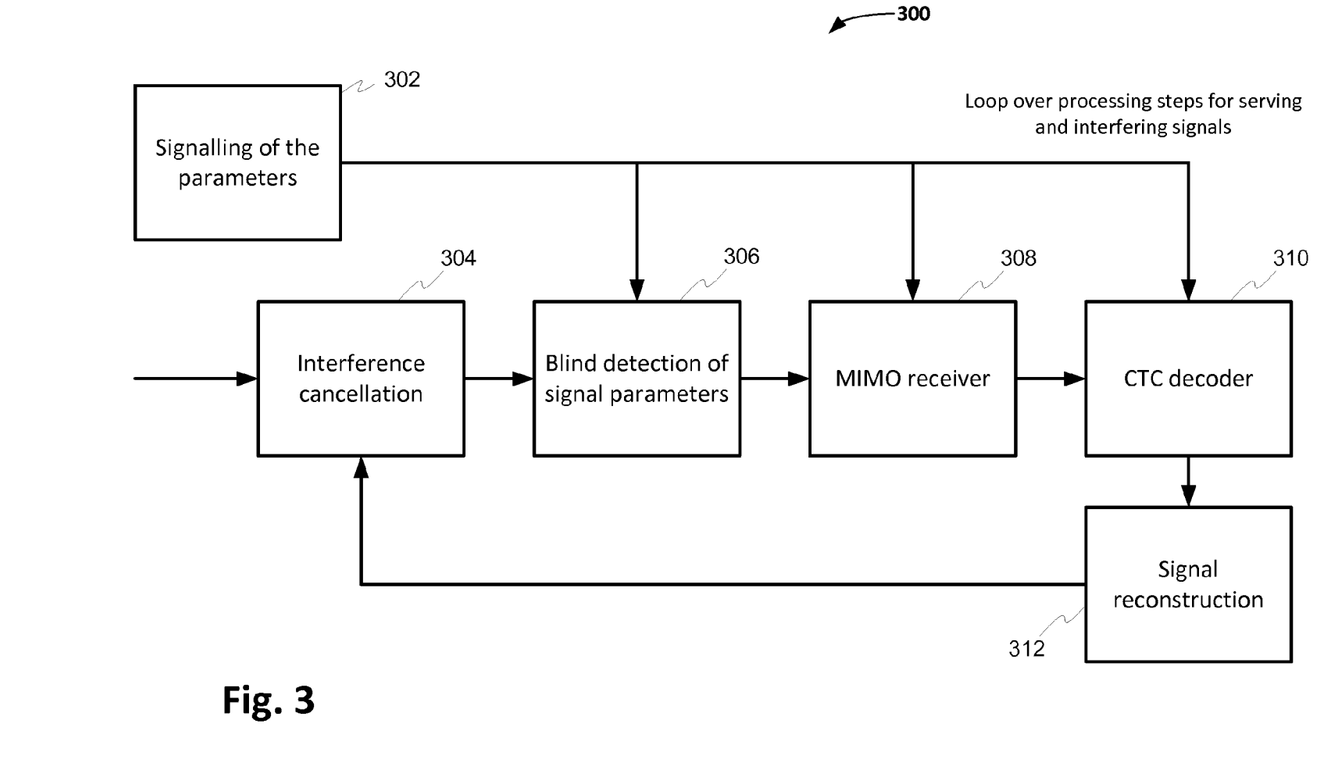
FIG. 3 is a schematic illustration of a code word level interference cancellation receiver in accordance with some embodiments.

The high-level structure of a CWIC receiver 300 that can be used to implement some embodiments is illustrated in FIG. 3, where processing of the received signal may be performed in iterations. In FIG. 3, it is assumed that some parameters of serving and interfering signals are known at the receiver e.g. via network signaling 302, while the remaining parameters can be estimated 306 from the received signal. The CWIC is typically started from MIMO demodulation 308 of the interfering signal including CTC decoding procedure 310 followed by the interfering signal recovery (reconstruction) 312 for the interference cancellation 304.

In order to limit the complexity of the CWIC receiver 300 to a reasonable level, the boundaries of the resource allocations of the co-scheduled layers should be aligned. Otherwise, the CWIC receiver 300 is required to perform extra processing associated with the decoding of the interfering signal outside of the resource allocation corresponding to the of the useful signal.

Figure 4:
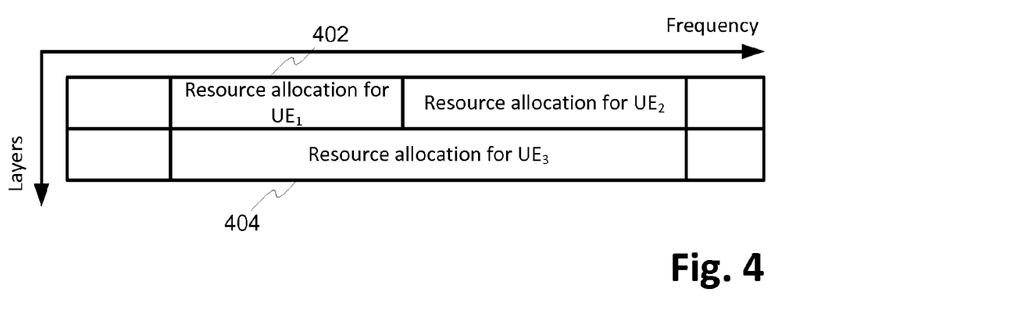
FIG. 4 illustrates resource allocations in a prior art two layer MU-MIMO transmission.

FIG. 4 illustrates resource allocations in a two layer MU-MIMO transmission where the boundaries of the resource allocations of the co-scheduled layers are not aligned. In order to perform CWIC for the signal 402 designated to UE1 in FIG. 4, UE1 is required to decode the entire allocation 404 designated to the UE3, a significant proportion of which resides outside of the resource allocation boundary for the useful signal 402. This imposes significant extra processing overhead on the CWIC process.

A conventional approach of forcing boundaries of the resource allocations on different layers to be always aligned has been found to be undesirable in practical networks due to associated scheduling constraints placed on transmissions from the eNBs.

According to some embodiments there is provided a novel method of resource allocation that can facilitate simple CWIC implementation for MU-MIMO without significant constraints in eNB scheduling decisions. The more flexible resource allocation methods provided may facilitate CWIC receivers for intra-cell interference cancellation and suppression and minimize the probability of eNB scheduling constraints. This may be achieved by splitting resource allocation into smaller resource allocation sub-blocks to achieve alignment of the allocations. Each resource allocation sub-block may be independently encoded to facilitate interference cancellation using CWIC receiver.

Figure 5:
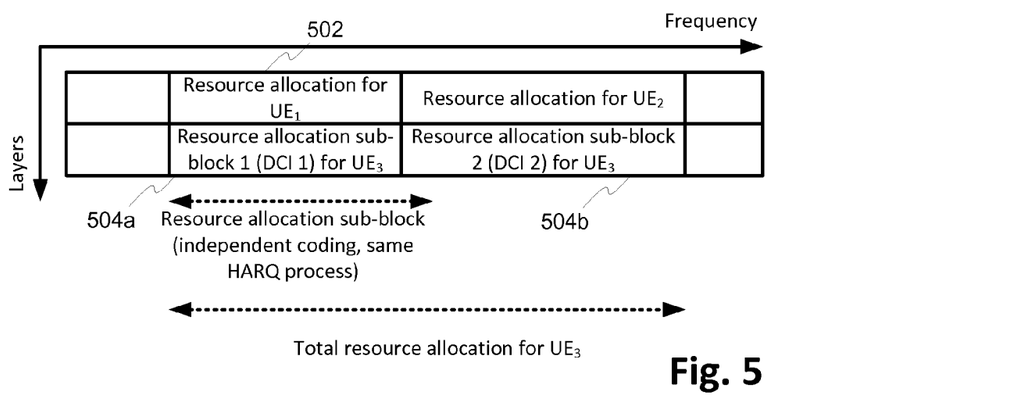
FIG. 5 illustrates resource allocations in a two layer MU-MIMO transmission according to some embodiments.

According to some embodiments, more than one downlink control information (DCI) (e.g. with CRC scrambled by C-RNTI) may be transmitted by the eNB 202 to the UE 204 to indicate the resource allocation sub-block boundaries (for example as illustrated in FIG. 5).

In the resource allocation map illustrated in FIG. 5, the resource allocations are similar to those shown in FIG. 4. However, in the resource allocation of FIG. 5, the allocation for UE3 is divided into two resource allocation sub-blocks 504a, 504b. Each resource allocation sub-block may be independent encoded, and the boundary between the sub-blocks is arranged such that resource allocation sub-block 1 504a is aligned with the resource allocation for UE1 502. Thus, the CWIC receiver of UE1 is only required to process the first allocation sub-block 504a in order to decode the resource allocation 502 for UE1.

To reduce control signaling overhead a single ACK/NACK report may be transmitted by the UE 204 via bundling of the ACK/NACK across all resource allocation sub-blocks in a given downlink subframe. To achieve this, the resource allocation sub-blocks received in multiple DCIs may share the same HARQ process number.

To support the transmission of more than one DCI (e.g. with CRC scrambled by C-RNTI, e.g. reception type D or D1) by the eNB to the UE to indicate the resource allocation sub-block boundaries (as in FIG. 5), the additional reception type combination may be defined in TS 36.302 e.g. as follows, where a new parameter y is used to indicate the maximum number of DCIs (e.g. with CRC scrambled by C-RNTI) that UE should monitor in a given DL subframe.

8.2 Downlink

The table describes the possible combinations of physical channels that can be received in parallel in the downlink in the same subframe by one UE. In one subframe, the UE shall be able to receive all TBs according to the indication on PDCCH.

TABLE 8.2-1

Downlink "Reception Types"

| "Reception Type" | Physical Channel(s) | Monitored RNTI | Associated Transport Channel |
|---|---|---|---|
| A | PBCH | N/A | BCH |
| B | PDCCH + PDSCH | SI-RNTI | DL-SCH |
| C | PDCCH + PDSCH | P-RNTI | PCH |
| D | PDCCH + PDSCH | RA-RNTI (Note 3) | DL-SCH |
|  |  | Temporary C-RNTI (Note 3) (Note 4) | DL-SCH |
|  | (PDCCH/EPDCCH) + PDSCH | C-RNTI and Semi-Persistent Scheduling C-RNTI | DL-SCH |
| D1 | (PDCCH/EPDCCH) + PDSCH (Note 9) | C-RNTI | DL-SCH |
| E | PDCCH/EPDCCH (Note 1) | C-RNTI | N/A |
| F | PDCCH | Temporary C-RNTI (Note 5) | UL-SCH |

TABLE 8.2-1-continued

Downlink "Reception Types"

| "Reception Type" | Physical Channel(s) | Monitored RNTI | Associated Transport Channel |
|---|---|---|---|
|  | PDCCH/EPDCCH | C-RNTI and Semi-Persistent Scheduling C-RNTI | UL-SCH |
| F1 | PDCCH/EPDCCH (Note 9) | C-RNTI | UL-SCH |
| G | PDCCH | TPC-PUCCH-RNTI | N/A |
| H | PDCCH | TPC-PUSCH-RNTI | N/A |
| I | PDCCH/EPDCCH | Semi-Persistent Scheduling C-RNTI (Note 6) | N/A |
| J | PDCCH/EPDCCH | Semi-Persistent Scheduling C-RNTI (Note 7) | N/A |
| K | PDCCH | M-RNTI (Note 8) | N/A |
| L | PMCH | N/A (Note 8) | MCH |

(Note 1)
PDCCH or EPDCCH is used to convey PDCCH order for Random Access.
Note 2
Void.
(Note 3)
RA-RNTI and Temporary C-RNTI are mutually exclusive and only applicable during Random Access procedure.
(Note 4)
Temporary C-RNTI is only applicable when no valid C-RNTI is available.
(Note 5)
Temporary C-RNTI is only applicable during contention-based Random Access procedure.
(Note 6)
Semi-Persistent Scheduling C-RNTI is used for DL Semi-Persistent Scheduling release.
(Note 7)
Semi-Persistent Scheduling C-RNTI is used for UL Semi-Persistent Scheduling release.
(Note 8)
In MBSFN subframes only
(Note 9)
DL-SCH reception corresponding to D1, and UL-SCH transmission corresponding to F1, are only applicable to SCells.

TABLE 8.2-2

Downlink "Reception Type" Combinations

| Combination | Mandatory/Optional | Comment |
|---|---|---|
| 1xA + 1xB + 1xC | Mandatory | RRC_IDLE |
| 1xK + 1xL | Mandatory for MBMS UEs | RRC_IDLE |
| 1xA + 1xB + 1x(D or (1 − m)xE or G or I) + (p − 1 − m)xD1 + mxE + 1x(F or H or J) + (q − 1)xF1 | Mandatory. (NOTE 3) | RRC_CONNECTED |
| 1xA + 1xB + 1x(vxD or (1 − m)xE or G or I) + (p − 1 − m)xD1 + mxE + 1x(F or H or J) + (q − 1)xF1 | Optional | RRC_CONNECTED |
| 1xA + 1xB + 1x(D or (1 − m)xE or G or I) + 1x(F or H or J) + 1xF + (p − 1 − m)xD1 + mxE + 2x(q − 1)xF1 | Mandatory for UEs supporting FS2. (NOTE 3) (NOTE 4) | RRC_CONNECTED (NOTE 1) |
| ((1x((1 − m)xE or G or I) + txL) or 1xD) + 1x(F or H or J) + rxK + (p − 1 − m)xD1 + mxE + (q − 1)xF1 + (r − t)xL + (r − t + 1)x(A + B) | Mandatory for MBMS UEs. (NOTE 3) (NOTE 4) | RRC_CONNECTED (NOTE 2) |
| ((1x((1 − m)xE or G or I) + txL) or 1xD) + 1x(F or H or J) + 1xF + rxK + (p − 1 − m)xD1 + mxE + 2x(q − 1)xF 1 + (r − t)xL + (r − t + 1)x(A + B) | Mandatory for MBMS UEs supporting FS2. (NOTE 3) | RRC_CONNECTED (NOTE 1) (NOTE 2) |
| 1xA + 1xB + 1xC + 1x(D or (1 − m)xE or G or I) + (p − 1 − m)xD1 + mxE + 1x(F or H or J) + (q − 1)xF1 | Mandatory for ETWS and CMAS UEs Optional for all other UEs. (NOTE 3) | RRC_CONNECTED |

TABLE 8.2-2-continued

Downlink "Reception Type" Combinations

| Combination | Mandatory/Optional | Comment |
|---|---|---|
| 1xA + 1xB + 1xC + 1x(D or (1 − m)xE or G or I) + 1x(F or H or J) + 1xF + (p − 1 − m)xD1 + mxE + 2x(q − 1)xF1 | Mandatory for ETWS and CMAS UEs supporting FS2 Optional for all other UEs. (NOTE 3) | RRC_CONNECTED (NOTE 1) |

(NOTE 1)
For TDD UL/DL configuration 0, two PDCCHs or EPDCCHs can be received in the same subframe for UL-SCH in two different uplink subframes.
(NOTE 2)
The combination is the requirement when MBMS reception is on PCell and/or any other cell. r is the number of DL CCs on which the UE supports MBMS reception according to the MBMSInterestIndication. t = 1 if there is PMCH reception in the PCell, otherwise t = 0. PDSCH and PMCH are mutually exclusive in the same subframe on a cell.
NOTE
p is the number of DL CCs supported by the UE. q is the number of UL CCs supported by the UE. q = p = 1 implies non-CA capable UE. m = 0 or 1 for UE supporting multiple TAGs, otherwise m = 0.
NOTE
The UE is only required to receive v PDSCH, pertaining to D or D1, per DL CC.
(NOTE 3)
Combination involving EPDCCH is optional and required only for UE supporting EPDCCH.
(NOTE 4)
It is not required to simultaneously receive EPDCCH and PMCH on the same cell.
NOTE
Any subset of the combinations specified in table 8.2-2 is also supported To reduce control signaling overhead single ACK/NACK report should be provided by the UE via bundling of ACK/NACK across all resource allocation sub-blocks in a given downlink subframe. The resource allocation sub-blocks received in multiple DCIs may share the same HARQ process number.

Figure 7:
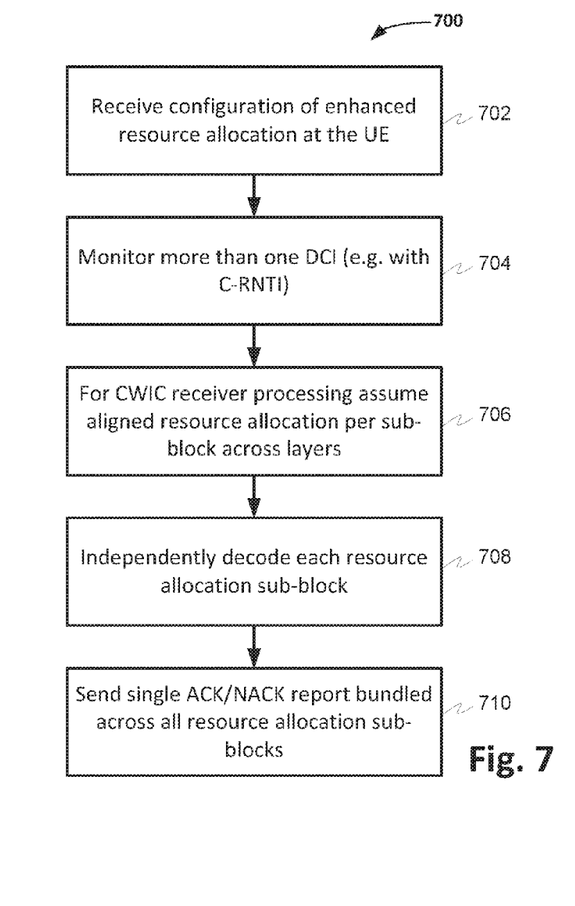
FIG. 7 illustrates a method of receiving the resource allocation of FIG. 5 at a UE according to some embodiments.

FIG. 7 illustrates a method 700 of receiving the resource allocation of FIG. 5 at a UE. According to the method of FIG. 7, the UE first receives 702 a configuration of enhanced resource allocation, indicating to the UE that multiple DCIs may be transmitted for each resource allocation. The UE then monitors 704 more than one DCI (e.g. with C-RNTI). The CWIC receiver 300 of the UE 204 then processes 706 the resource allocation for UE1, assuming that the resource allocations for each sub-block are aligned across all layers. Each resource allocation sub-block may then be independently decoded 708. The UE 204 then responds 710 with a single ACK/NACK report bundled across all the resource allocation sub-blocks in the resource allocation 502 for the UE.

According to some embodiments, the resource allocation may be scheduled by a single DCI as in the current LTE-A specification. However, prior to the transmission, the resource allocation is subdivided into resource allocation sub-blocks of a pre-defined size (as illustrated in FIG. 6).

Figure 6:
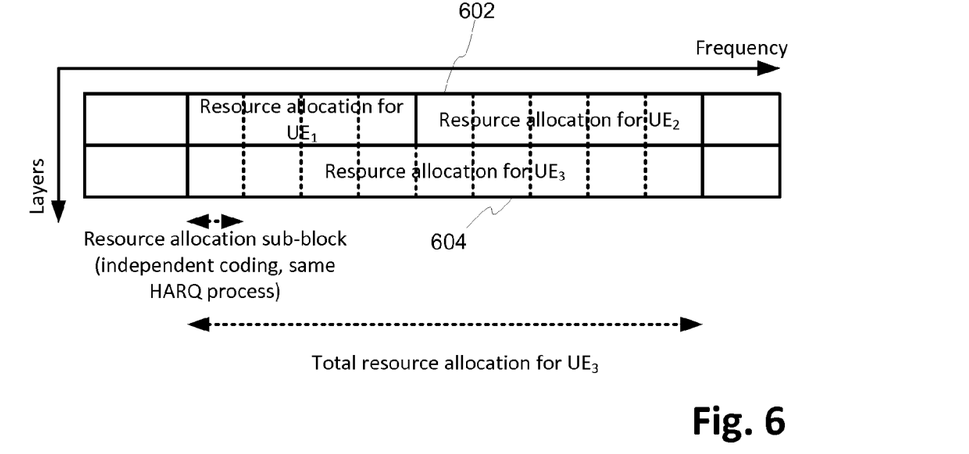
FIG. 6 illustrates resource allocations in a two layer MU-MIMO transmission according to some embodiments.

In the resource allocation map illustrated in FIG. 6, the total resource allocations for each device are similar to those shown in FIG. 4. However, each of the allocations are divided into a number of resource allocation sub-blocks of a pre-defined size. This allows the boundaries of resource allocations in different layers to be more easily aligned to support the use of CWIC receivers.

Similar to the arrangement of FIG. 5, each resource allocation sub-block may be independently encoded. The transport block (or resource allocation sub-block) size can be determined in accordance to the number of physical resource blocks (PRBs) in the sub-block and an Modulation and Coding Scheme (MCS) index signaled in the scheduling DCI. The size of sub-block in the arrangement of FIG. 6 may be RRC configured or predefined in the specification (e.g. set equal to RBG size).

For the resource allocation arrangement of FIG. 6, the resource allocation is scheduled by a single DCI as in the current LTE-A specification. However, prior to the transmission, it is subdivided into resource allocation sub-blocks of a pre-defined size.

Figure 8:
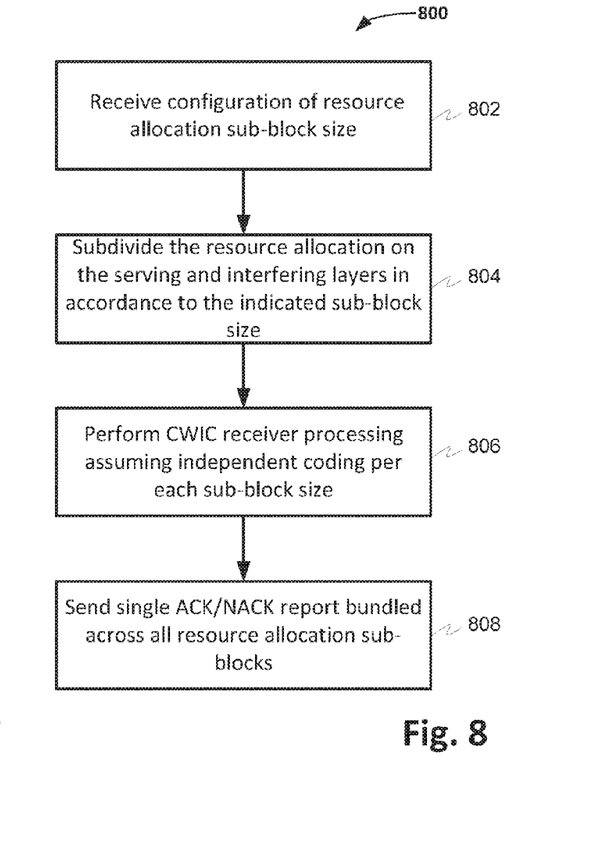
FIG. 8 illustrates a method of receiving the resource allocation of FIG. 6 at a UE according to some embodiments.

FIG. 8 illustrates a method 800 of receiving the resource allocation of FIG. 6 at a UE. According to the method of FIG. 8, the UE first receives 802 a configuration of resource allocation sub-block size. For example, the sub-block size may be received from the network in the case that it is configured by the RRC. The resource allocation on the serving and interfering layers is then subdivided 804, in accordance with the indicated sub-block size. CWIC receiver processing is then performed 806 on the resource allocation 602 for UE1 and the interfering allocation 604 for UE3 assuming independent coding for each allocation sub-block. The UE then responds 808 with a single ACK/NACK report bundled across all the resource allocation sub-blocks in the resource allocation 602 for the UE.

Figure 9:
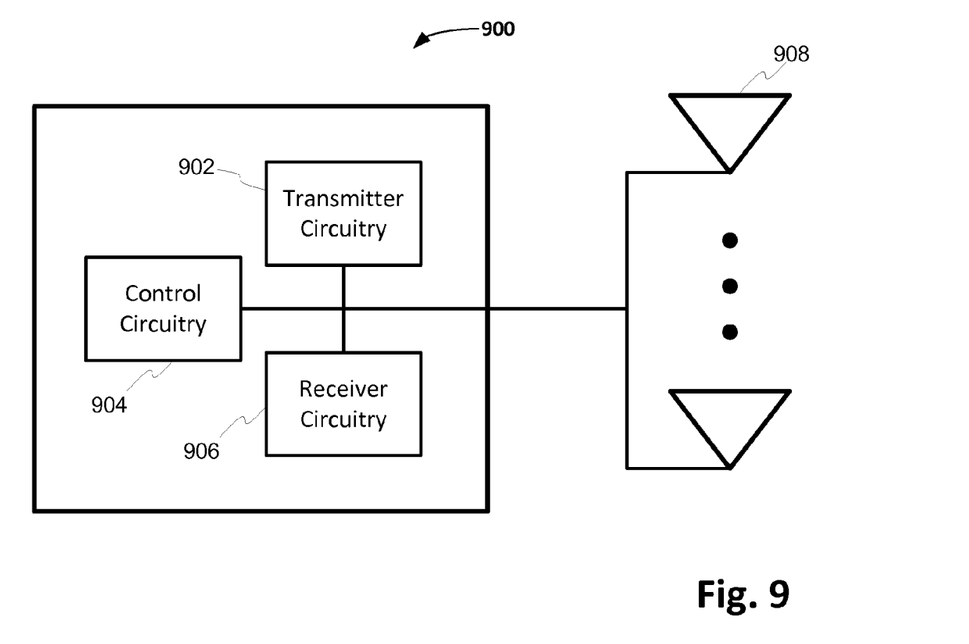
FIG. 9 illustrates circuitry suitable for implementing a UE or eNB according to some embodiments.

FIG. 9 illustrates circuitry that may be UE 204 circuitry or eNB 202 circuitry, in accordance with various embodiments. In embodiments, the UE/eNB circuitry 900 may include radio transmitter circuitry 902 and receiver circuitry 906 coupled to control circuitry 904. The UE/eNB circuitry 900 may be coupled with one or more plurality of antenna elements 908 of one or more antennas. The UE/eNB circuitry 900 and/or the components of the UE/eNB circuitry 900 may be configured to perform operations similar to those described elsewhere in this disclosure.

Specifically, if the circuitry 900 of FIG. 9 is UE circuitry, the receive circuitry 906 may be to receive an indication of a higher-layer configuration of flexible resource allocation; and receive an indication of downlink resource allocation for a downlink subframe in a radio frame. The control circuitry 904 may be to identify a first resource allocation sub-block 504a of the downlink resource allocation and a second resource allocation sub-block 504b of the downlink resource allocation; and decode a first physical downlink shared channel (PDSCH) message within the first resource allocation sub-block and a second PDSCH message within the second resource allocation sub-block. The transmit circuitry 902 may be to transmit an acknowledgement (ACK) message or a negative acknowledgement (NACK) message related to the downlink resource allocation.

If the circuitry 900 of FIG. 9 is eNB circuitry, the control circuitry 904 may be to schedule a flexible resource allocation for a user equipment (UE) 204; generate a first sub-block 504a of the flexible resource allocation and a second sub-block 504b of the flexible resource allocation; and channel code within the first sub-block and the second sub-block wherein a channel coding of the first sub-block is independent of a channel coding of the second sub-block. The transmit circuitry 902 may be to transmit an indication of the flexible resource allocation to the UE 204.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

Figure 10:
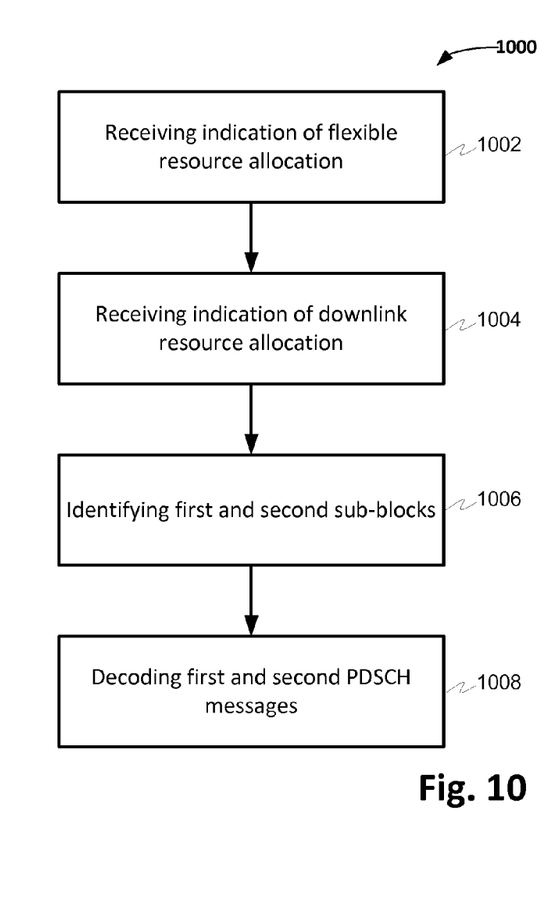
FIG. 10 illustrates a method performed by a UE according to some embodiments.

In embodiments, the circuitry 900 of FIG. 9 may be configured to perform one or more processes. FIG. 10 depicts one such process 1000 that may be performed by the circuitry of FIG. 9 if the circuitry 900 is UE circuitry. Specifically, the process may include receiving 1002, from an evolved NodeB (eNB) 202, an indication of a higher-layer configuration of flexible resource allocation. The process may further include receiving 1004, from the eNB 202, an indication of downlink resource allocation for a downlink subframe in a radio frame. The process may further include identifying 1006 a first resource allocation sub-block of the downlink resource allocation and a second resource allocation sub-block of the downlink resource allocation. The process may further include decoding 1008 a first physical downlink shared channel (PDSCH) message within the first resource allocation sub-block and a second PDSCH message within the second resource allocation sub-block.

Figure 11:
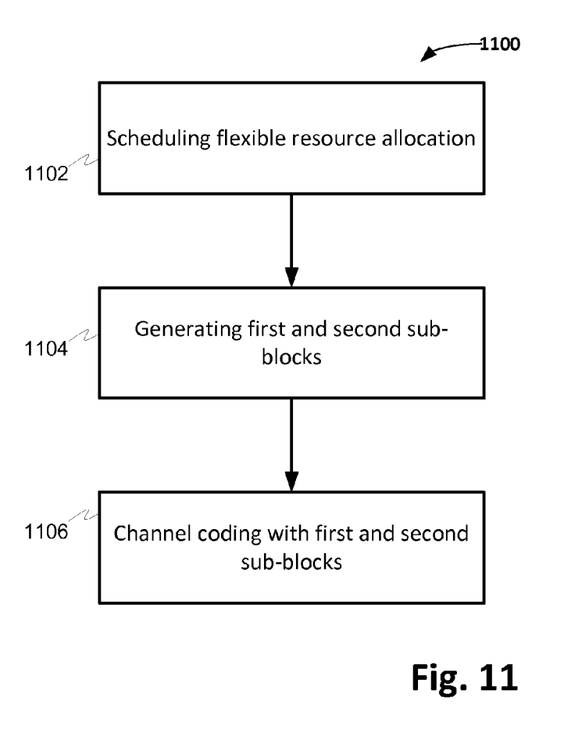
FIG. 11 illustrates a method performed by a eNB according to some embodiments.

FIG. 11 depicts a process 1100 that may be performed by the circuitry 900 of FIG. 9 if the circuitry is eNB circuitry. Specifically, the process 1100 may include scheduling 1102 a flexible resource allocation for a user equipment (UE) 204. The process may further include generating 1104 a first sub-block of the flexible resource allocation and a second sub-block of the flexible resource allocation. The process may further include channel coding 1106 within the first sub-block and the second sub-block wherein the channel coding of the first sub-block is independent of the channel coding of the second sub-block.

Figure 12:
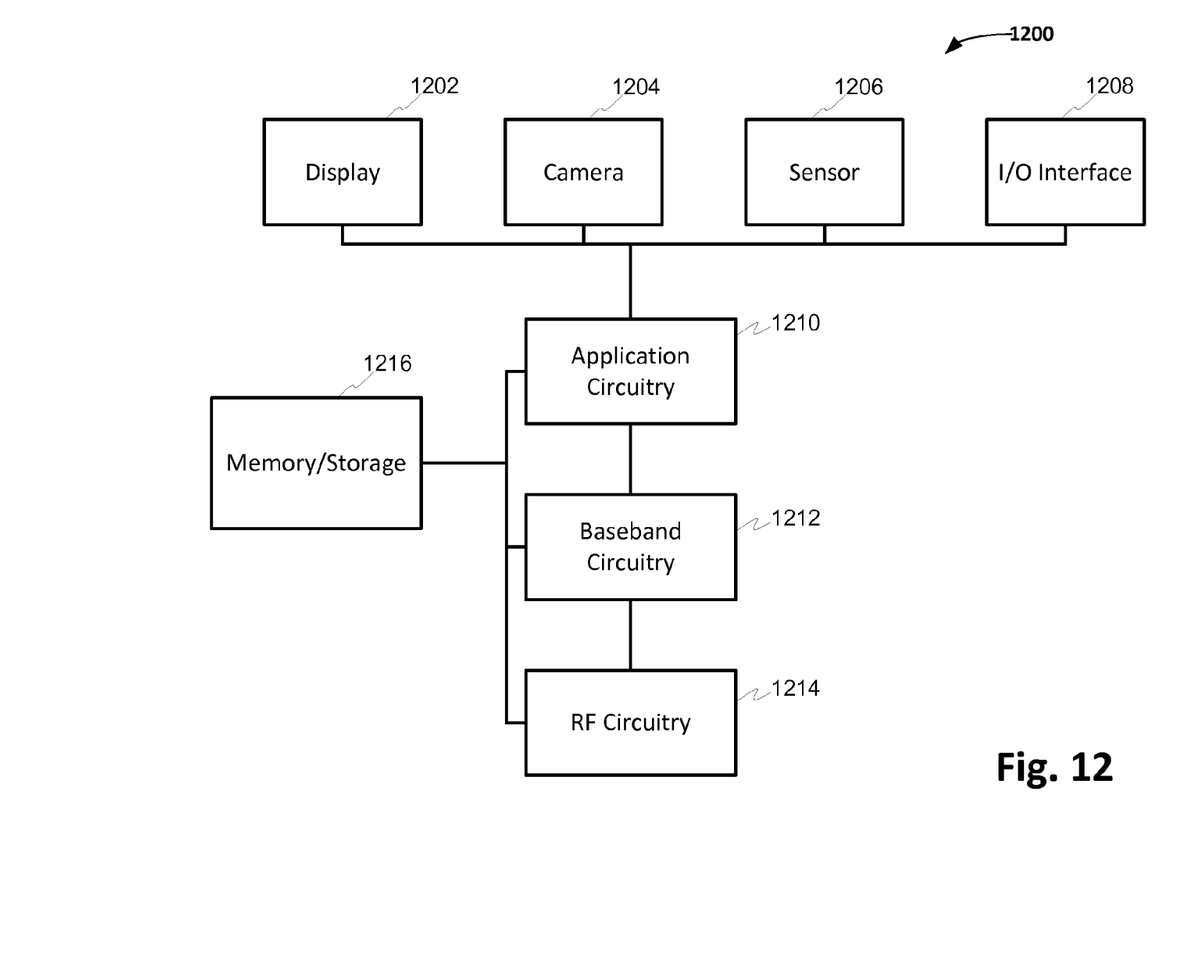
FIG. 12 illustrates an example system suitable for implementing some embodiments.

Embodiments described herein may be implemented into a system using any suitably configured hardware and/or software. FIG. 12 illustrates, for one embodiment, an example system 1200 comprising radio frequency (RF) circuitry 1214, baseband circuitry 1212, application circuitry 1210, memory/storage 1216, display 1202, camera 1204, sensor 1206, and input/output (I/O) interface 1208, coupled with each other at least as shown.

The application circuitry may include circuitry such as, but not limited to, one or more single-core or multi-core processors. The processor(s) may include any combination of general-purpose processors and dedicated processors (e.g., graphics processors, application processors, etc.). The processors may be coupled with memory/storage 1216 and configured to execute instructions stored in the memory/storage 1216 to enable various applications and/or operating systems running on the system.

The baseband circuitry 1212 may include circuitry such as, but not limited to, one or more single-core or multi-core processors. The processor(s) may include a baseband processor. The baseband circuitry 1212 may handle various radio control functions that enables communication with one or more radio networks via the RF circuitry 1214. The radio control functions may include, but are not limited to, signal modulation, encoding, decoding, radio frequency shifting, etc. In some embodiments, the baseband circuitry 1212 may provide for communication compatible with one or more radio technologies. For example, in some embodiments, the baseband circuitry 1212 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 1212 is configured to support radio communications of more than one wireless protocol may be referred to as multi-mode baseband circuitry.

In various embodiments, baseband circuitry 1212 may include circuitry to operate with signals that are not strictly considered as being in a baseband frequency. For example, in some embodiments, baseband circuitry 1212 may include circuitry to operate with signals having an intermediate frequency, which is between a baseband frequency and a radio frequency.

RF circuitry 1214 may enable communication with wireless networks using modulated electromagnetic radiation through a non-solid medium. In various embodiments, the RF circuitry 1214 may include switches, filters, amplifiers, etc. to facilitate the communication with the wireless network.

In various embodiments, RF circuitry 1214 may include circuitry to operate with signals that are not strictly considered as being in a radio frequency. For example, in some embodiments, RF circuitry 1214 may include circuitry to operate with signals having an intermediate frequency, which is between a baseband frequency and a radio frequency.

In various embodiments, the transmitter circuitry 902, control circuitry 904, or receiver circuitry 906 discussed above with respect to the UE 204 or eNB 202 may be embodied in whole or in part in one or more of the RF circuitry 1214, the baseband circuitry 1212, and/or the application circuitry 1210. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry 1212, the application circuitry 1210, and/or the memory/storage 1216 may be implemented together on a system on a chip (SOC).

Memory/storage 1216 may be used to load and store data and/or instructions, for example, for system. Memory/storage 1216 for one embodiment may include any combination of suitable volatile memory (e.g., dynamic random access memory (DRAM)) and/or non-volatile memory (e.g., Flash memory).

In various embodiments, the I/O interface 1208 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments the sensor 1206 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry 1212 and/or RF circuitry 1214 to communicate with components of a positioning network, e.g., a global positioning system (GPS) satellite.

In various embodiments, the display 1202 may include a display (e.g., a liquid crystal display, a touch screen display, etc.).

In various embodiments, the system 1200 may be a mobile computing device such as, but not limited to, a laptop computing device, a tablet computing device, a netbook, an ultrabook, a smartphone, etc. In various embodiments, system may have more or less components, and/or different architectures.

While embodiments of the present invention are described with reference to an LTE network, some embodiments may be used with other types of wireless access networks.

The described inventive embodiments may be used in a variety of applications including transmitters and receivers of a radio system, although the present invention is not limited in this respect. Radio systems specifically included within the scope of the present invention include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

Some Examples are presented below.

Example 1 may include a user equipment (UE), configured to: receive a higher-layer configuration of flexible resource allocation; receive dynamic information on the downlink resource allocation in a given downlink (DL) subframe; split the resource allocation into resource allocation sub-blocks; independently decode physical downlink shared channel (PDSCH) within each resource allocation sub-block; AND report ACK/NACK for the resource allocation.

Example 2 may include the UE of Example 1 wherein the resource allocation sub-blocks within resource allocation is determined by the UE by monitoring two or more DCIs with CRC scrambled by C-RNTI for the DL component carrier.

Example 3 may include the UE of Example 1 wherein the resource allocation sub-block size is determined in accordance to the higher layer signaling.

Example 4 may include the UE of Example 3 wherein the resource allocation sub-block size is equal to one or multiple of resource block group (RBG) size.

Example 5 may include the UE of Example 1 UE assumes in the receiver aligned boundaries for the resource allocation sub-blocks on the serving and interfering layers.

Example 6 may include the UE of Example 1 wherein ACK/NACK for the resource allocation is determined by bundling of ACK/NACK reports across resource allocation sub-blocks.

Example 7 may include a method of flexible resource allocation for the UEs, wherein the method includes: scheduling of the resource allocations for the UEs; splitting the resource allocation in accordance to the resource allocation sub-block size; and independent channel coding within each resource allocation sub-block.

Example 8 may include the method of Example 7, wherein splitting the resource allocation into resource allocation sub-blocks is accomplished by sending more than one DCIs to the UE with CRC scrambled by C-RNTI for a given DL subframe and DL component carrier.

Example 9 may include the method of Example 7, wherein method of splitting of the resource allocation into resource allocation sub-block is accomplished in accordance to the fixed sub-block size parameter.

Example 10 may include the method of Example 9, wherein the fixed sub-block size is equal to one or multiple of resource block group (RBG) size.

Example 11 may include the method of Example 9, wherein transport block size is determined in accordance to the number of physical resource block in the resource allocation sub-block and index of nodulation and coding scheme indicated in the scheduling DCI.

Example 12 may include a method of communicating in a wireless network as shown and described herein.

Example 13 may include a system for providing wireless communication as shown and described herein.

Example 14 may include a device for providing wireless communication as shown and described herein.

Example 15 may include a method comprising: receiving, by a user equipment (UE) from an evolved NodeB (eNB), an indication of a higher-layer configuration of flexible resource allocation; receiving, by the UE from the eNB, an indication of downlink resource allocation for a downlink subframe in a radio frame; identifying, by the UE, a first resource allocation sub-block of the downlink resource allocation and a second resource allocation sub-block of the downlink resource allocation; and decoding, by the UE, a first physical downlink shared channel (PDSCH) message within the first resource allocation sub-block and a second PDSCH message within the second resource allocation sub-block.

Example 16 may include the method of Example 15, wherein the indication of downlink resource allocation is a dynamic indication of downlink resource allocation.

Example 17 may include the method of Example 15, wherein the decoding the first PDSCH message is independent of the decoding of the second PDSCH message.

Example 18 may include the method of any of Examples 15-17, further comprising reporting, by the UE, an acknowledgement (ACK) message or a negative acknowledgement (NACK) message related to the downlink resource allocation.

Example 19 may include the method of Example 18, further comprising generating, by the UE, the ACK message or the NACK message based on bundling of ACK or NACK reports across the first and second resource allocation sub-blocks.

Example 20 may include the method of any of Examples 15-17, further comprising identifying, by the UE, the first and second resource allocation sub-blocks based on monitoring of two or more downlink control information (DCI) messages having cyclic redundancy check (CRC) portions scrambled by a cell radio network temporary identifier (C-RNTI) for a downlink component carrier.

Example 21 may include the method of any of Examples 15-17, further comprising identifying, by the UE, a size of the first or second resource allocation sub-blocks based on higher layer signaling.

Example 22 may include the method of Example 21, wherein the size of the first or second resource allocation sub-block is equal to one or a multiple of a size of a resource block group (RBG).

Example 23 may include the method of any of Examples 15-17, further comprising assuming, by the UE, boundaries of the first and second resource allocation sub-blocks are aligned on a serving layer and an interfering layer.

Example 24 may include a user equipment (UE) comprising receive circuitry to: receive an indication of a higher-layer configuration of flexible resource allocation; and receive an indication of downlink resource allocation for a downlink subframe in a radio frame. The UE of Example 24 may additionally include control circuitry coupled with the receive circuitry, the control circuitry to: identify a first resource allocation sub-block of the downlink resource allocation and a second resource allocation sub-block of the downlink resource allocation; and decode a first physical downlink shared channel (PDSCH) message within the first resource allocation sub-block and a second PDSCH message within the second resource allocation sub-block. The UE of Example 24 may further include transmit circuitry coupled to the control circuitry, the transmit circuitry to transmit an acknowledgement (ACK) message or a negative acknowledgement (NACK) message related to the downlink resource allocation.

Example 25 may include the UE of Example 24, wherein the indication of downlink resource allocation is a dynamic indication of downlink resource allocation.

Example 26 may include the UE of Example 24, wherein the control circuitry is further to decode the first PDSCH message independently of the second PDSCH message.

Example 27 may include the UE of Example 24, wherein the control circuitry is further to generate the ACK message or the NACK message based on bundling of ACK or NACK reports across the first and second resource allocation sub-blocks.

Example 28 may include the UE of any of Examples 24-27, wherein the control circuitry is further to identify the first and second resource allocation sub-blocks based on monitoring of two or more downlink control information (DCI) messages having cyclic redundancy check (CRC) portions scrambled by a cell radio network temporary identifier (C-RNTI) for a downlink component carrier.

Example 29 may include the UE of any of Examples 24-27, wherein the control circuitry is further to identify a size of the first or second resource allocation sub-blocks based on higher layer signaling.

Example 30 may include the UE of Example 29, wherein the size of the first or second resource allocation sub-block is equal to one or a multiple of a size of a resource block group (RBG).

Example 31 may include the UE of any of Examples 24-27, wherein the boundaries of the first and second resource allocation sub-blocks are aligned on a serving layer and an interfering layer.

Example 32 may include a method comprising: scheduling, by an evolved NodeB (eNB), a flexible resource allocation for a user equipment (UE); generating, by the eNB, a first sub-block of the flexible resource allocation and a second sub-block of the flexible resource allocation; and channel coding, by the eNB, within the first sub-block and the second sub-block wherein the channel coding of the first sub-block is independent of the channel coding of the second sub-block.

Example 33 may include the method of Example 32, wherein the channel coding is related to a physical downlink shared channel (PDSCH) message.

Example 34 may include the method of Example 32, wherein the generating the first sub-block and the second sub-block includes transmitting, by the eNB, more than one downlink control information (DCI) message to the UE.

Example 35 may include the method of Example 34, further comprising scrambling, by the eNB, cyclic redundancy check (CRC) portions of the DCI messages by a cell radio network temporary identifier (C-RNTI) related to a downlink subframe and a downlink component carrier.

Example 36 may include the method of any of Examples 32-35, wherein the generating the first and second sub-blocks of the flexible resource allocation is based on a sub-block size parameter.

Example 37 may include the method of Example 36, wherein the sub-block size parameter is equal to one or a multiple of a resource block group (RBG) size.

Example 38 may include the method of Example 36, wherein a transport block size is based on a number of physical resource blocks in the first or second sub-blocks of the flexible resource allocation and an index of a modulation and coding scheme indicated in a scheduling downlink control information (DCI) message.

Example 39 may include an evolved NodeB (eNB) comprising control circuitry to: schedule a flexible resource allocation for a user equipment (UE); generate a first sub-block of the flexible resource allocation and a second sub-block of the flexible resource allocation; and channel code within the first sub-block and the second sub-block wherein a channel coding of the first sub-block is independent of a channel coding of the second sub-block. The eNB of Example 39 may further include transmit circuitry coupled with the control circuitry, the transmit circuitry to transmit an indication of the flexible resource allocation to the UE.

Example 40 may include the eNB of Example 39, wherein the channel coding is related to a physical downlink shared channel (PDSCH) message.

Example 41 may include the eNB of Example 39, wherein the transmit circuitry is to transmit more than one downlink control information (DCI) message to the UE.

Example 42 may include the eNB of Example 41, wherein the control circuitry is further to scramble cyclic redundancy check (CRC) portions of the DCI messages by a cell radio network temporary identifier (C-RNTI) related to a downlink subframe and a downlink component carrier.

Example 43 may include the eNB of any of Examples 39-42, wherein the control circuitry is to generate the first and second sub-blocks of the flexible resource allocation is based on a sub-block size parameter.

Example 44 may include the eNB of Example 43, wherein the sub-block size parameter is equal to one or a multiple of a resource block group (RBG) size.

Example 45 may include the eNB of Example 43, wherein a transport block size is based on a number of physical resource blocks in the first or second sub-blocks of the flexible resource allocation and an index of a modulation and coding scheme indicated in a scheduling downlink control information (DCI) message.

Example 46 may include one or more non-transitory computer-readable media comprising instructions to cause a computing device, upon execution of the instructions by one or more processors of the computing device, to perform the method of any of Examples 7-11, 15-23, and 32-38.

Example 47 may include an apparatus comprising means to perform the method of any of Examples 7-11, 15-23, and 32-38.

The invention claimed is:

1. A user equipment (UE) comprising:
receiver circuitry to:
receive a higher layer configuration of flexible resource allocation; and
receive dynamic information on a downlink resource allocation in a given downlink (DL) subframe;
control circuitry to:
divide the downlink resource allocation into resource allocation sub-blocks with boundaries of resource allocation sub-blocks on a serving layer in alignment with boundaries of resource allocation sub-blocks on an interfering layer; and
independently decode a physical downlink shared channel (PDSCH) within each resource allocation sub-block; and
transmitter circuitry to transmit an acknowledge/negative acknowledgment (ACK/NACK) for the downlink resource allocation.

2. The UE of claim 1, wherein the resource allocation sub-blocks within the downlink resource allocation are determined by the UE by monitoring two or more downlink control information (DCIs) with cyclic-redundancy control (CRC) scrambled by cell radio network temporary identifier (C-RNTI) for a DL component carrier.

3. The UE of claim 1, wherein a resource allocation sub-block size is determined in accordance with higher layer signaling.

4. The UE of claim 3, wherein the resource allocation sub-block size is equal to one or a multiple of a resource block group (RBG) size.

5. The UE of claim 1 wherein the ACK/NACK for the resource allocation is determined by bundling of ACK/NACK reports across resource allocation sub-blocks.

6. One or more non-transitory, computer-readable media having instructions to cause a user equipment (UE), upon execution of the instructions by one or more processors of the UE, to:
receive, from an evolved NodeB (eNB), an indication of a higher layer configuration of flexible resource allocation;
receive, from the eNB, an indication of downlink resource allocation for a downlink subframe in a radio frame;
identify a first resource allocation sub-block of the downlink resource allocation on a serving layer and a second resource allocation sub-block of the downlink resource allocation on an interfering layer, wherein boundaries of the first and second resource allocation sub-blocks are aligned; and
decode a first physical downlink shared channel (PDSCH) message within the first resource allocation sub-block and a second PDSCH message within the second resource allocation sub-block.

7. The one or more non-transitory, computer-readable media of claim 6, wherein the indication of downlink resource allocation is a dynamic indication of downlink resource allocation.

8. The one or more non-transitory, computer-readable media of claim 6, wherein the instructions, when executed, cause the UE to decode the first PDSCH message independent of the second PDSCH message.

9. The one or more non-transitory, computer-readable media of claim 6, wherein the instructions, when executed, further cause the UE to report an acknowledgement (ACK) message or a negative acknowledgement (NACK) message related to the downlink resource allocation.

10. The one or more non-transitory, computer-readable media of claim 9, wherein the instructions, when executed, further cause the UE to generate the ACK message or the NACK message based on bundling of ACK or NACK reports across the first and second resource allocation sub-blocks.

11. The one or more non-transitory computer-readable media of claim 6, wherein the instructions, when executed, further cause the UE to identify the first and second resource allocation sub-blocks based on monitoring of two or more downlink control information (DCI) messages having cyclic redundancy check (CRC) portions scrambled by a cell radio network temporary identifier (C-RNTI) for a downlink component carrier.

12. The one or more non-transitory, computer-readable media of 6, wherein the instructions, when executed, further cause the UE to identify a size of the first or second resource allocation sub-blocks based on higher layer signaling.

13. The one or more non-transitory, computer-readable media of claim 12, wherein the size of the first or second resource allocation sub-block is equal to one or a multiple of a size of a resource block group (RBG).

14. An evolved NodeB (eNB) comprising:
control circuitry to:
schedule a flexible resource allocation for a user equipment (UE);
generate a first sub-block of the flexible resource allocation to be transmitted on a first layer and a second sub-block of the flexible resource allocation to be transmitted on a second layer, wherein boundaries of the first and second resource allocation sub-blocks are aligned; and
channel code within the first sub-block and the second sub-block wherein a channel coding of the first sub-block is independent of a channel coding of the second sub-block; and
transmit circuitry coupled with the control circuitry, the transmit circuitry to transmit an indication of the flexible resource allocation to the UE.

15. The eNB of claim 14, wherein the channel coding is related to a physical downlink shared channel (PDSCH) message.

16. The eNB of claim 14, wherein the transmit circuitry is to transmit more than one downlink control information (DCI) message to the UE.

17. The eNB of claim 14, wherein the control circuitry is to generate the first and second sub-blocks of the flexible resource allocation based on a sub-block size parameter.

18. One or more non-transitory, computer-readable media comprising instructions to cause a computing device, upon execution of the instructions by one or more processors of the computing device, to:
- receive an indication of a higher layer configuration of flexible resource allocation;
- receive an indication of downlink resource allocation for a downlink subframe in a radio frame;
- identify a first resource allocation sub-block of the downlink resource allocation on a serving layer and a second resource allocation sub-block of the downlink resource allocation on an interfering layer, wherein boundaries of the first and second resource allocation sub-blocks are aligned; and
- decode a first physical downlink shared channel (PDSCH) message within the first resource allocation sub-block and a second PDSCH message within the second resource allocation sub-block.

* * * * *